(12) United States Patent
Kritzer et al.

(10) Patent No.: US 9,401,503 B2
(45) Date of Patent: Jul. 26, 2016

(54) SEALING FRAME FOR USE IN A BATTERY

(75) Inventors: Peter Kritzer, Forst (DE); Thomas Kramer, Rimbach (DE); Helmut Zischka, Weissach (DE)

(73) Assignee: Carl Freudenberg KG, Weinheim (DE)

( * ) Notice: Subject to any disclaimer, the term of this patent is extended or adjusted under 35 U.S.C. 154(b) by 523 days.

(21) Appl. No.: 12/821,691

(22) Filed: Jun. 23, 2010

(65) Prior Publication Data

US 2011/0003197 A1 Jan. 6, 2011

(30) Foreign Application Priority Data

Jul. 6, 2009 (EP) .................... 09008802

(51) Int. Cl.
| | |
|---|---|
| *H01M 2/08* | (2006.01) |
| *H01M 2/10* | (2006.01) |
| *F16J 15/06* | (2006.01) |
| *F16J 15/12* | (2006.01) |
| *H01M 10/615* | (2014.01) |
| *H01M 10/647* | (2014.01) |
| *H01M 10/6557* | (2014.01) |
| *H01M 10/6554* | (2014.01) |
| *H01M 10/613* | (2014.01) |
| *H01M 10/60* | (2014.01) |
| *H01M 10/0525* | (2010.01) |

(Continued)

(52) U.S. Cl.
CPC ............ *H01M 2/1072* (2013.01); *F16J 15/064* (2013.01); *F16J 15/122* (2013.01); *H01M 2/1241* (2013.01); *H01M 10/0413* (2013.01); *H01M 10/0525* (2013.01); *H01M 10/48* (2013.01); *H01M 10/60* (2015.04); *H01M 10/613* (2015.04); *H01M 10/615* (2015.04); *H01M 10/647* (2015.04); *H01M 10/6554* (2015.04); *H01M 10/6557* (2015.04); *H01M 2/12* (2013.01); *H01M 2/1223* (2013.01); *H01M 2/1229* (2013.01); *H01M 2/1264* (2013.01); *H01M 2/1282* (2013.01); *H01M 2/1294* (2013.01); *H01M 10/04* (2013.01); *H01M 10/0481* (2013.01); *H01M 10/0486* (2013.01); *H01M 10/058* (2013.01); *H01M 10/0585* (2013.01); *H01M 2220/20* (2013.01)

(58) Field of Classification Search
None
See application file for complete search history.

(56) References Cited

U.S. PATENT DOCUMENTS 4,265,365 A * 5/1981 Boteler .................... 220/3.3
5,521,024 A 5/1996 Sasaki et al.
(Continued)

FOREIGN PATENT DOCUMENTS

| CN | 1670986 A | 9/2005 |
| CN | 101180750 B | 6/2010 |

(Continued)

OTHER PUBLICATIONS

U.S. Appl. No. 12/855,252, filed Aug. 12, 2010, Kritzer et al.

(Continued)

*Primary Examiner* — Ula C Ruddock
*Assistant Examiner* — Matthew Van Oudenaren
(74) *Attorney, Agent, or Firm* — Daniel J. Sepanik, Esq.; Harness, Dickey & Pierce, P.L.C.

(57) ABSTRACT

A battery includes at least two sealing frames and at least one cell. The sealing frames include a base body defining an opening wherein the base body includes a first sealing surface embodied to be elastically compressible and positioned against opposite sides of a tapered area of the at least one cell.

12 Claims, 7 Drawing Sheets

(51) Int. Cl.
 *H01M 10/48* (2006.01)
 *H01M 2/12* (2006.01)
 *H01M 10/04* (2006.01)
 *H01M 10/058* (2010.01)
 *H01M 10/0585* (2010.01)

(56) References Cited

U.S. PATENT DOCUMENTS

| | | | |
|---|---|---|---|
| 2003/0031925 A1* | 2/2003 | During | 429/162 |
| 2003/0054244 A1* | 3/2003 | Fredriksson et al. | 429/210 |
| 2005/0260493 A1* | 11/2005 | Frederiksson et al. | 429/210 |
| 2008/0171259 A1* | 7/2008 | Kanai et al. | 429/53 |
| 2009/0017365 A1* | 1/2009 | Miyahisa et al. | 429/54 |

FOREIGN PATENT DOCUMENTS

| | | |
|---|---|---|
| CN | 1992381 B | 4/2011 |
| DE | 102008041475 A1 | 2/2009 |
| EP | 0339364 A2 | 11/1989 |
| EP | 1577966 A2 | 9/2005 |
| EP | 2366200 A1 | 9/2011 |
| EP | 2416439 A2 | 2/2012 |
| EP | 2432045 A2 | 3/2012 |
| FR | 2875057 A1 | 3/2006 |
| JP | 09055217 A | 2/1997 |
| JP | 2004014125 A | 1/2004 |
| JP | 2005108693 A | 4/2005 |
| JP | 2005268004 A | 9/2005 |
| JP | 2005268029 A | 9/2005 |
| JP | 2008103239 A | 5/2008 |
| WO | 2005096412 A1 | 10/2005 |
| WO | 2010/067943 A1 | 6/2010 |

OTHER PUBLICATIONS

U.S. Appl. No. 12/823,740, filed Jun. 25. 2010, Kritzer.

* cited by examiner

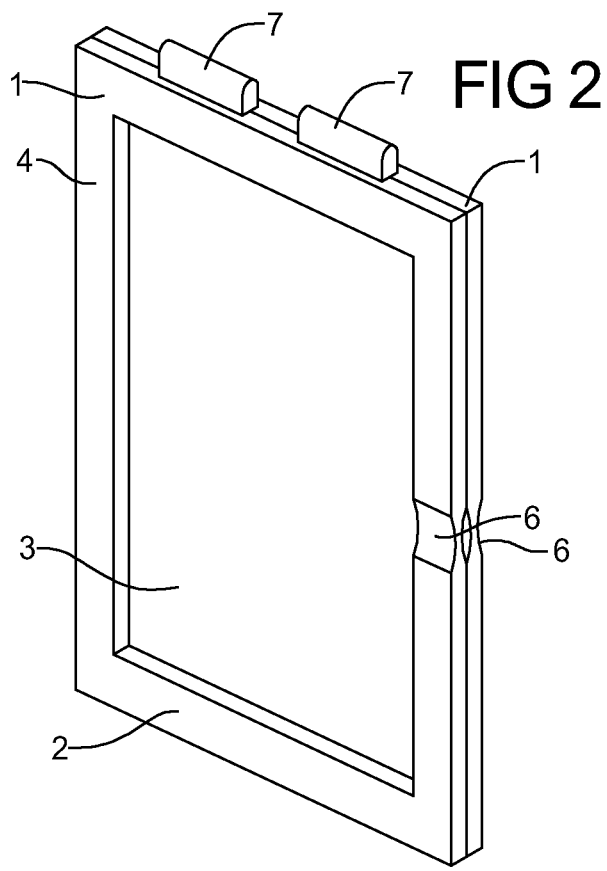
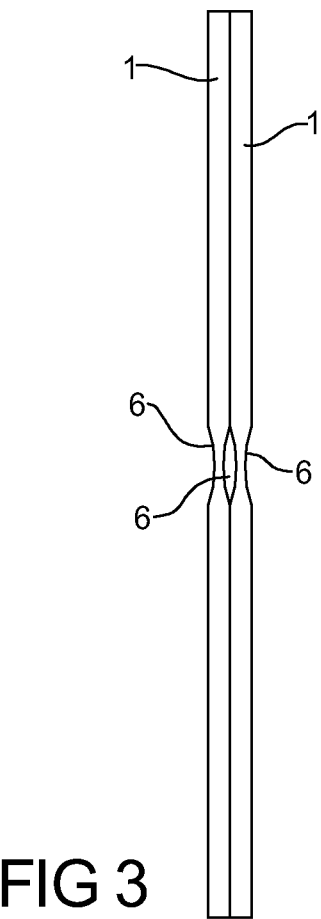
FIG 2
FIG 3

SEALING FRAME FOR USE IN A BATTERY

CROSS-REFERENCE TO RELATED APPLICATIONS

This application claims the benefit and priority of European Application No. 09008802.2, filed Jul. 6, 2009 (now European Patent No. 2 273 162 A1). The entire disclosure of the above application is incorporated herein by reference.

FIELD

The present disclosure relates to a sealing frame for use in a battery, comprising a base body, wherein the base body encompasses an opening, wherein the base body encompasses a first sealing surface and a second sealing surface located opposite thereto.

BACKGROUND

This section provides background information related to the present disclosure which is not necessarily prior art.

Larger batteries are composed of individual cells. Typically, a battery for hybrid or electric vehicles, respectively, or for industrial applications contains between twenty and several hundreds of individual cells. The individual cells can thereby be embodied as round cells, as prismatic cells or as so-called coffee bag cells. Coffee bag cells comprise a flexible shell, composed of a film, in which electric components of a cell are arranged.

To realize an optimal use of space in a battery, coffee bag cells are used above all. They are furthermore characterized by having a low weight, yet a high capacity. Coffee bag cells can be cooled well via the thermally conductive films. Cells of this design can furthermore be scaled easily, because the size of all of the components of the cell, including the film housing, can easily be varied in production.

Due to high stored energy quantities, larger batteries always represent a safety risk in response to the occurrence of malfunctions. Lithium batteries must thereby be considered to be particularly critical, because they encompass a high energy density, a combustible electrolyte and thin separators. Finally, lithium batteries generate high cell voltages, so that the components arranged in the cell are subjected to high electrochemical stresses. This is particularly relevant in the case of automobile and industrial batteries, for which life cycles of at least 8-10 years are assessed.

The afore-mentioned coffee bag cells can be installed in a space-saving manner. For example, large quantities of energy per unit of volume can be stored in a battery. However, considerable construction-related disadvantages are connected therewith. Due to the flexible shell, the dimension of coffee bag cells changes when they are charged or discharged. This is also connected to a volume expansion. The volume expansion leads to typical changes in thickness of an individual cell of approximately 5% between charged and non-charged state.

In the case of an assembly of a so-called "stack", which consists of many individual cells, which are connected in series, it must thus be considered that the individual cells display a variable volume. In particular, it must be ensured that the cells in the charged state, in which they take on their largest thickness, apply virtually no pressure or only a slight pressure on the surfaces of adjacent cells. On principle, it must thereby also be considered that, due to the production tolerances, the thickness of the flexible cells is also not consistent, but is subject to fluctuations.

There is furthermore a demand for an arrangement, by means of which impacts or vibrations are absorbed and/or damped, so that the interior of the battery as well as contacts are not damaged. Connections of the conduction and control electronics must furthermore be connected to the battery so as to be as free from mechanical stresses as possible. A disconnection of even one of the many hundreds of contacts of the power electronics leads to a malfunction of the battery in response to a series connection. In the case of a malfunction of a contact of the control electronics, the cell, which is then no longer controlled, can gradually reach a critical state, which in the medium term can lead to a deterioration or breakdown of the entire battery.

The flanges of the afore-mentioned coffee bag cells encompass a sealed seam. This sealed seam connects two films of a cell, which thus enclose further components in the hollow space formed thereby. For this purpose, the inside of the films are coated with an electrically insulating, adhesion-promoting sealing thermoplastic. This sealing thermoplastic can be formed from a functionalized polyolefin. This sealed seam represents a mechanical weak spot of a coffee bag cell.

Furthermore, the air pressure in the environment of the cell can fluctuate. In the event that the housing of a battery is closed in an air-tight manner, temperature-related pressure fluctuations of typically 0.2 bar can occur. These pressure fluctuations additionally stress the sealed seams.

The sealed seam, however, also represents a predetermined breaking point, which is to allow the electrolyte to discharge in the event of a breakdown of the battery. Through this, a bursting of the cell is to be avoided. In the event that the escaping combustible electrolyte comes into contact with electrodes, it can ignite and can lead to fires or explosions. For the most part, the maximally permissible overpressures in the interior of a coffee bag cell are far below 0.1 MPa, so as to prevent an opening of the sealed seam. The lead-through of the power-diverting electrodes is to be considered to be particularly critical in the case of coffee bag cells. For the most part, they encompass a thickness of approximately 0.1 to 0.3 mm. In this range, a possible leakage is also particularly critical, because escaping electrolyte can instantaneously ignite at the electrodes. The sealed seam is generally considered to be a weak spot of large cells, because it is subjected to constant stresses for many years, which are caused by the cyclizing.

Finally, water-based cooling agents are currently preferably used for the cooling of large batteries or fluorinated carbon hydride or carbon dioxide in response to the use of air conditioning systems. A direct contact of most of the cooling agents with the interior of the cells can lead to a severe chemical reaction. In the case of water-based cooling agents, hydrogen, for example, which is highly flammable and which can lead to explosions, is released. A contact cooling is thus typically used in the art for this reason, wherein the thermal flow between cell and cooling circuit is established via thermally conductive components and the cooling agent can thus not be in direct contact to the cells.

SUMMARY

This section provides a general summary of the disclosure, and is not a comprehensive disclosure of its full scope or all of its features.

The invention is thus based on the object of embodying and further developing a battery in such a manner that it encompasses reliable leak tightness during normal operation, yet allows the electrolyte to escape without problems and in a directed manner in response to breakdowns.

The instant invention solves the afore-mentioned object by a sealing frame of the afore-mentioned type being characterized in that the first sealing surface and/or the second sealing surface are embodied so as to be elastically compressible.

According to the invention, it has been discovered that elastically compressible sealing surfaces can encompass and overlap a predetermined breaking point, such as a sealed seam, abutting thereon so as to form a seal. On the one hand, the cells within a battery are mechanically fixed by means of such a sealing frame and, on the one hand, they can slightly vary their volume in the reference area of the front and rear side, without causing wearing stresses. The elastically compressible sealing surfaces compensate for a slight variation in volume of the cells without any problems, so that mechanical stresses are not transferred to the electrical connections. Elastically compressible sealing surfaces can furthermore dampen and absorb vibrations. The weak spot of a cell is additionally sealed, because an elastic contact pressure acts thereon. Through this, an escape of electrolytes from the inside to the outside is strongly suppressed. Cooling agents prevailing from the outside, in particular water or moisture prevailing from the environment are furthermore kept away from the interior of the battery. Finally, it has been discovered that a reference discharge location can be added without any problems in the sealing frame in an elastically compressible sealing surface. In the event of a breakdown, said reference discharge location allows the electrolyte to escape from the inside to the outside. Through this, the electrolyte is discharged at a distance from the electrodes and can thus not ignite at the electrodes.

In terms of a simple production, the base body can be made from an elastically compressible material. Against this background, it is concretely tangible for the base body to be made in one piece from an elastic material, such as silicon, silicon rubber, SBR or EPDM. Due to the fact that the seal is not subjected to a direct media contact, for the most part, other elastomers, such as NBR, can also be used. The use of silicon allows for an additional overlapping of the seal across the electrodes. In response to the use of carbon-based rubber, it can in this case not always be precluded that the high voltages in the electrode charge eliminators lead to a carbonization of the elastomer surface and thus to a loss of the insulating effect. The overlapping allows for the mechanical fixing of the electrodes and supports the stability of the contacting thereof.

The first sealing surface and/or the second sealing surface can be embodied as an elastically compressible layer or as sealing track, which is affixed onto a non-elastic support body. Through this, a highly stable sealing frame can be produced, which is still embodied so as to be elastically compressible at the critical locations, namely at the sealing surfaces. Against this background, it is concretely tangible for the non-elastic support body to be enclosed in a sandwich-like manner between two elastically compressible layers. A one-sided application of an elastically compressible layer onto the non-elastic support body is also possible. The non-elastic support body could be made from a thermoplastic plastic, a thermosetting material or a metal. The advantages of a thermoplastic plastic are its light weight and the low costs. A plastic is furthermore not electrically conductive. Metals are good thermal conductors and can thus be used for cooling purposes. The metal should hereby be completely accommodated by the elastically compressible layers in an encapsulated manner, in particular in the area of the electrode deviation plates. By using thermally conductive plastics, for example a thermoplastic containing carbon fibers, the thermal conductivity of the plastics and thus their heat transfer can be improved considerably. Finally, it is possible for the base body to be made as a two-component part by means of die casting technology. A rapid production can be attained through this. The seal could be applied onto the support by means of vulcanization, spraying, insertion or adhesion.

A recess can be embodied in the first sealing surface and/or in the second sealing surface. The sealed seam of a coffee bag cell can be in contact with the atmosphere by means of the recess. Against this background, it is possible for a recess to be embodied in one sealing surface or in both sealing surfaces. Provided that two sealing frames abut on one another, the recesses join to form an enlarged opening, by means of which the sealed seam can attain contact with the atmosphere. The cross section of the opening can thereby be embodied so as to be curved, semi-circular or rectangular. The curved, semi-circular embodiment allows for an application to the sealed seam without contact pressure. Through this, a reference discharge location is attained, through which the electrolyte can be discharged into the environment. The recess should be arranged at a distance from the electrodes. Instead of the recess, it could be possible to realize a seal having a low contact pressure on the sealed seam in a local area. This can take place by means of a locally applied elastomer material, which has a higher elasticity than the elastomer material of the sealing surfaces. It is ensured through this that a permeation of moisture from the outside is prevented at the sealed seam under normal process conditions. In the case of a breakdown, when it becomes necessary to discharge the electrolyte, the overpressure thereof is sufficient to widen the locally weakened seal. Such a desired weak spot could be attained, for example, by means of a softer elastomer, a locally lower contact pressure or by means of a locally different arrangement. In the alternative, said weak spot could be covered by means of a thin film.

Provision can be made in the opening of the sealing frame for bars, which encompass a thickness, which is less than the thickness of the base body. The bars allow for a resilient spacing of the thickened, bellied areas of the cell housings of the cells.

The base body can encompass boreholes. Different sealing frames, which are arranged next to one another, can be connected to one another by means of boreholes. Against this background, it is also possible for two sealing frames to be connected to one another in terms of a groove-spring connection. It is concretely tangible hereby for blind holes or boreholes, which accommodate journals of a further sealing frame, to be arranged in a base body.

The boreholes can be embodied in lugs, which project away from the base body. On the one hand, the lugs allow for a problem-free gripping of the sealing frame and, on the other hand, do not allow for the sealing surfaces to be weakened or reduced by boreholes. In addition, they allow for a strictly parallel arrangement of the cells, which are arranged next to one another.

The base body can be provided with an adhesive. Against this background, it is concretely tangible for an adhesive strip to be arranged on the base body. Two sealing frames can be glued to one another by means of an adhesive or an adhesive strip or the sealing fame can be adhered to the sealed seam. This provides for a rapid and accurate setup of stacks.

A cooling device can be integrated into the sealing frame. Through this, the sealing frames can be used in larger batteries, in the case of which a cooling of the cells is required. Against this background, it is possible for the cooling device to be embodied as a metal body, which is accommodated in a sandwich-like manner between two elastically compressible layers. The elastic seal of the sealed seam could be used in areas other than for an additional sealing of the cooling circuit, wherein the heat transfer from the cells to the cooling device preferably takes place via the sealed seams, which abut on the metal bodies. The metal body should thereby be accommodated in an encapsulated manner and should be enclosed completely by the layers, in particular in the area of the electrode deviation plates. Other embodiments of the cooling device comprise a lacquer, which is heat conductive to a particularly high degree, a heat-conductive thermoplastic or a heat-conductive elastomer. The cooling device could comprise thermally conductive elastomers, which are in contact to an external cooling circuit or cooling webs. This embodiment represents a passive cooling. In the case of an active cooling, cooling ducts, through which a cooling agent flows, could be affixed in or between the elastic sealing frames. The cooling medium can thereby flow through a plurality of sealing frames, which are combined to form a stack and can thus maintain the temperature of a plurality of cells. Through this, the cells can be cooled reliably and temperature can be maintained homogeneously.

A battery can comprise at least two sealing frames of the herein-described type and at least one cell, wherein the cell is positioned between two sealing frames, wherein the cell encompasses a thickened area, which extends into the openings of the base bodies thereof and wherein the cell encompasses a tapered area, on which the sealing surfaces abut so as to form a seal. The tapered area corresponds to the sealed seam. By means of such an arrangement of cells, the predetermined breaking points thereof, which are located at the tapered area, can be enclosed in a sandwich-like manner by two sealing frames. Such a battery according to the invention is suitable for mobile applications, in particular in vehicles or aircrafts as well as for stationary applications, for example for systems, which require an uninterrupted power supply.

Against this background, the sealing surfaces can accommodate the tapered area at least area by area in a sandwich-like manner and can abut on one another so as to form a seal. Concretely, it is tangible for the sealing surfaces to enclose the tapered area in a sandwich-like manner in a zone, which faces the opening and for them to directly abut on one another in a zone, which faces away from the opening. In the upper zone, which faces away from the opening, the sealing surfaces abut on one another so as to form a seal and seal the interior of the cells against harmful media.

Deviation plates of the electrodes of the cells, which project beyond the sealing frames, can be accommodated between the sealing frames. The sealing frames abut on the deviation plates so as to form a seal, so that harmful media cannot enter from the outside to the inside or from the inside to the outside. The deviation plates thereby project beyond the sealing frames, so that they can be contacted without any problems.

At least one sensor, which detects pressures, can be arranged between the sealing frames. Cells, which inflate, can be detected without any problems by means of such a sensor, in particular a pressure sensor. Highly inflating cells represent a typical phenomenon for defective cells.

The cells can be embodied as coffee bag cells comprising a sealed seam, wherein the tapered area of the cells is embodied as a sealed seam. Coffee bag cells are characterized by a high capacity per construction volume. Concretely, coffee bag cells encompass a flexible cell housing. In fact, the cell housing is a film, into which the interior of the cell is sealed analogous to the coffee in a coffee package. This film can be embodied as a metal film, which is coated on both sides. This technology provides for the production of thinner cells and for a greater design flexibility. Additional advantages are an increased energy density, which is effected by the compact design and lower production costs. The flexibility of the design makes the cells particularly attractive for the mobile cellular telephone and computer market.

Against this background, the cell is embodied as a lithium ion cell. The cell could furthermore be embodied as a lithium polymer cell, in the case of which a polymer matrix, which almost completely absorbs or fixes the electrolyte in a virtually leak-proof manner, is used instead of a liquid electrolyte.

An exhaust hood can be arranged on the battery. Through this, it can be ensured that discharged gases or electrolytes are diverted securely. The exhaust hood can be made of metal, plastic or an elastomer and must be sealed relative to the sealing frames. The exhaust hood can thereby cover a plurality of recesses, which are arranged next to one another. If applicable, the exhaust hood could be equipped with a film or a rupture disk, respectively, so that it keeps moisture away from the sealed seam of the coffee bag cell under normal conditions. The exhaust hood can then be in contact with the environment via a tube or a pipe, for example. A valve, which opens from the inside only in response to a prevailing overpressure, can additionally be placed into this tube or into the pipe. By means of this arrangement, it would be ensured that the electrolyte is securely and specifically diverted from the interior of the battery, in particular away from the electrodes, in response to the discharge of the electrolyte in the event of a breakdown.

The battery can encompass a further fixed fixing frame. The further fixed fixing frame could be made of plastic or of metals, which can be coated with non-conductive materials. This fixed frame additionally ensures that a constant and even contact pressure is applied to the sealing locations. The fixed frame furthermore provides for an improved and secure assembly of the stack of the cells, which are equipped with the sealing frames, in the housing of the battery. Such an arrangement furthermore facilitates the maintenance and the replacement of defective cells.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 shows a perspective view of two abutting sealing frames;

FIG. 3 shows a side view of two abutting sealing frames;

Figure 9:
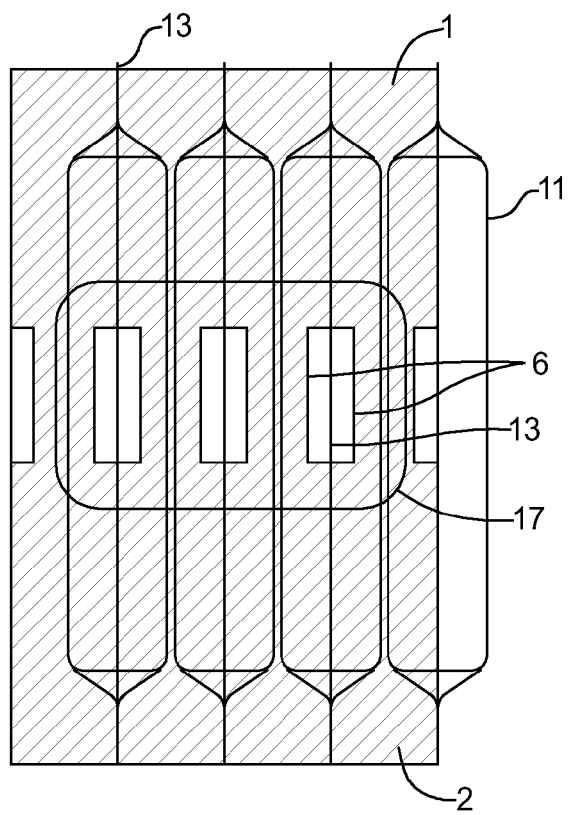
Figure 10:
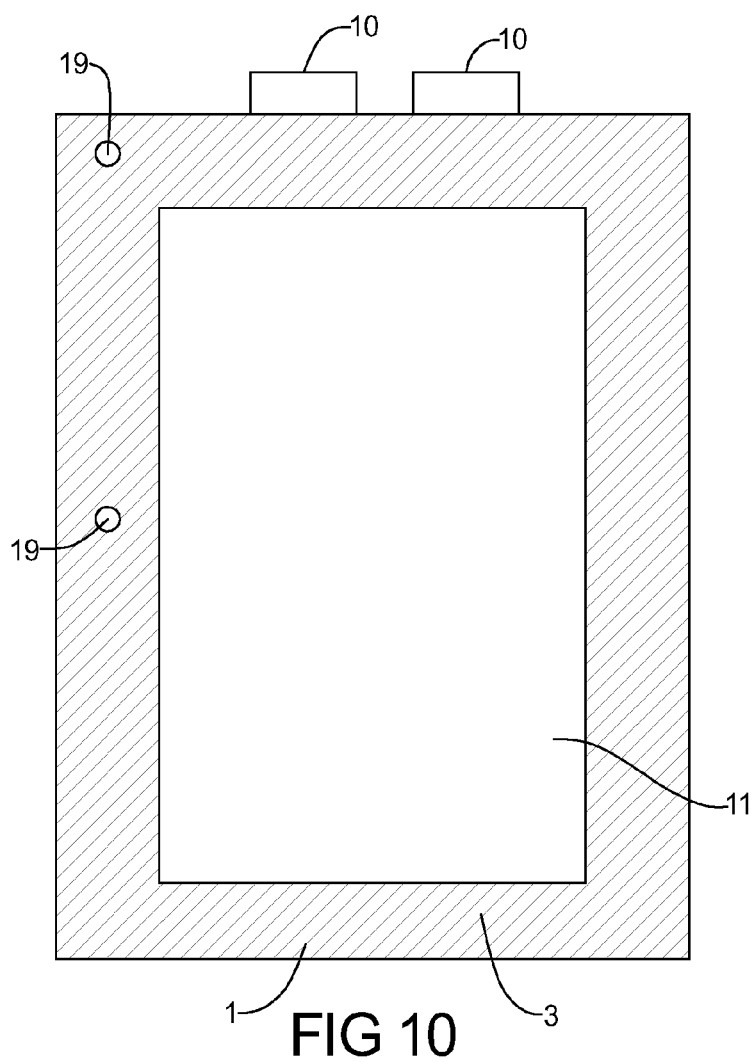
Figure 10A:
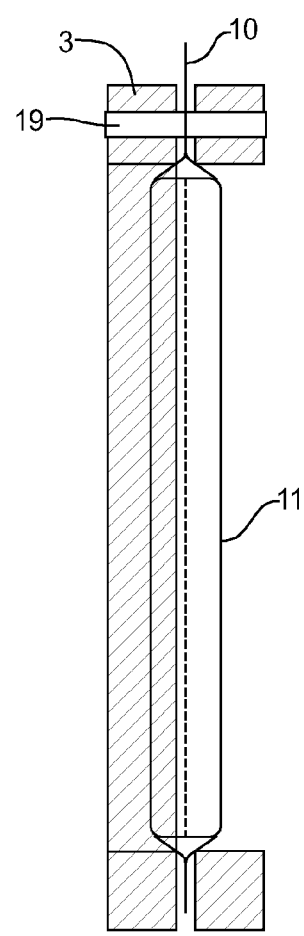

FIG. 9 shows two sealing frames abutting on one another comprising recesses, the cross section of which is embodied in a curved manner, as well as a schematic view of an exhaust hood, which is affixed above the recesses and which is connected to the sealing frames in a positive manner; and FIG. 10 shows a sealing frame comprising an integrated cooling device; and FIG. 10A is a schematic sectional view of the sealing frame of FIG. 10.

Corresponding reference numerals indicate corresponding parts throughout the several views of the drawings.

DETAILED DESCRIPTION

Example embodiments will now be described more fully with reference to the accompanying drawings.

Figure 1:
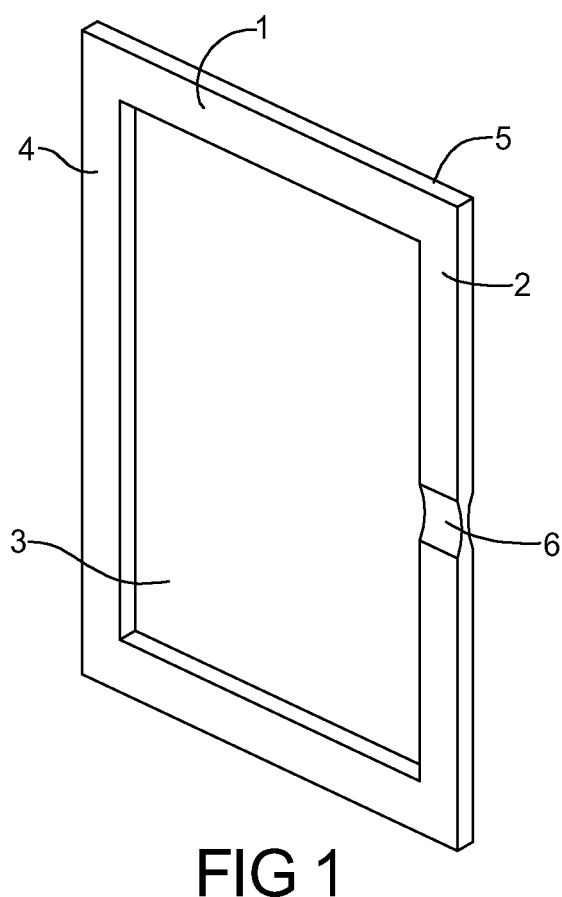
FIG. 1 shows a perspective view of a rectangular sealing frame.

FIG. 1 shows a sealing frame 1 for use in a battery, comprising a base body 2, wherein the base body 2 encompasses an opening 3, wherein the base body 2 encompasses a first sealing surface 4 and a second sealing surface 5 located opposite thereto. The first sealing surface 4 and the second sealing surface 5 are embodied so as to be elastically compressible. The base body 2 is embodied in a rectangular manner and encompasses four journals, which enclose the opening 3 in a continuous manner. The first sealing surface 4 is oriented parallel to the second sealing surface 5, wherein both sealing surfaces 4, 5 are aligned with the opening 3.

The base body 2 is made from an elastically compressible material. A recess 6, the cross section of which is embodied in a curved manner, is in each case embodied in the first sealing surface 4 and in the second sealing surface 5.

FIG. 2 shows a perspective view of two sealing frames 1, which are designed according to FIG. 1 and which are arranged so as to abut on one another. Lugs 7, in which boreholes can be arranged, project away from the base body 2. Through the boreholes, the sealing frames 1 can be fixed to one another by means of screws. A constant and sufficiently high contact pressure across the entire base body 2 of the sealing frames 1 can be ensured through this.

FIG. 3 shows a second view of two abutting sealing frames 1 according to FIG. 2, wherein two curved recesses 6 join to form a reference discharge location for an electrolyte.

Figure 4:
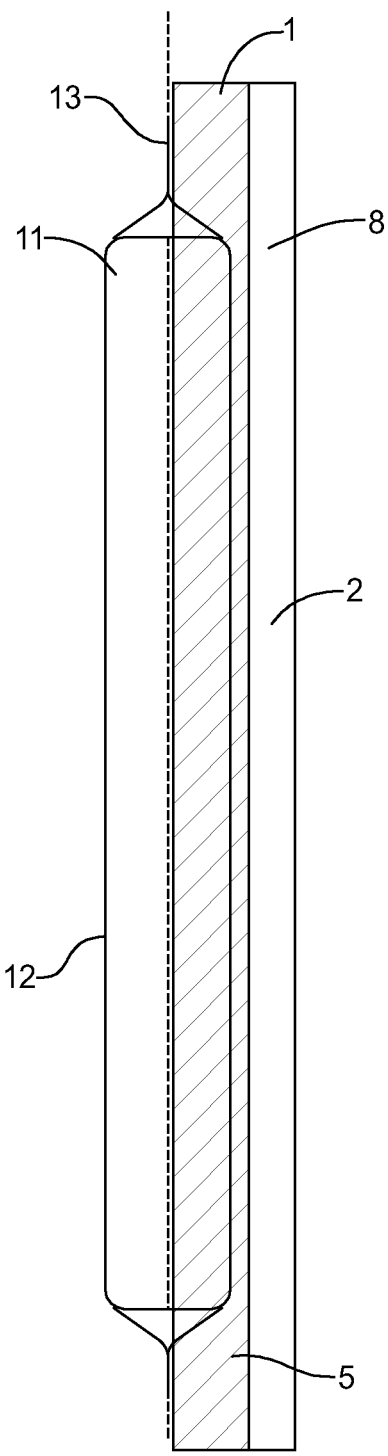
FIG. 4 shows a sealing frame, which comprises an inflexible support body, onto which an elastically compressible layer is applied on one side.

FIG. 4 shows a sealing frame 1 comprising a base body 2, in the case of which the second sealing surface 5 is embodied as an elastically compressible layer, which is applied onto a non-elastic support body 8.

Figure 5:
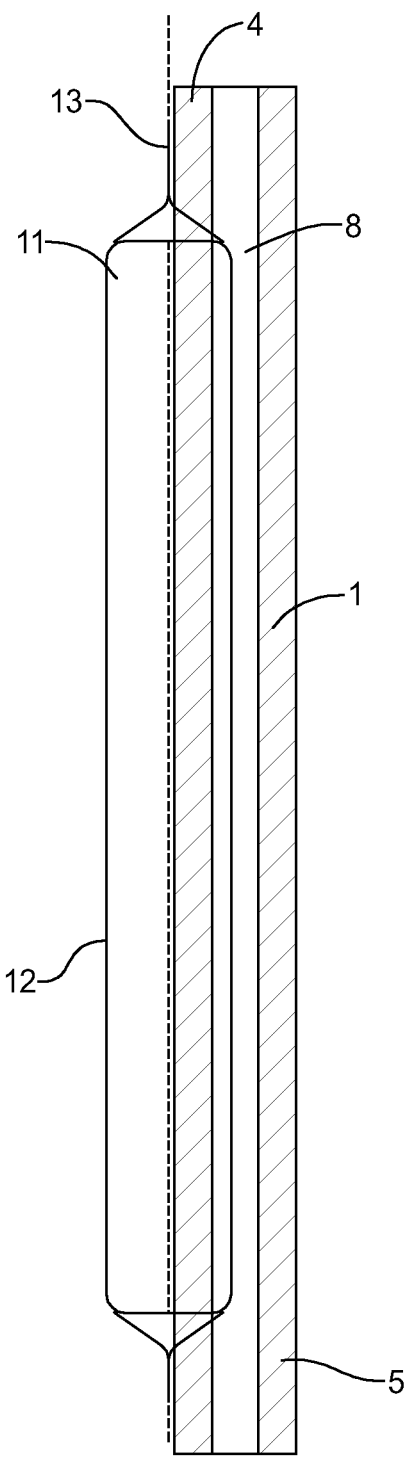
FIG. 5 shows a sealing frame, in the case of which elastically compressible layers are applied on both sides of a non-elastic support body.

FIG. 5 shows a sealing frame 1, in the case of which the first sealing surface 4 and the second sealing surface 5 are in each case embodied as elastically compressible layers. The layers are applied on both sides of a non-elastic support body 8. The support body 8 is enclosed in a sandwich-like manner by the compressible layers.

Figure 6:
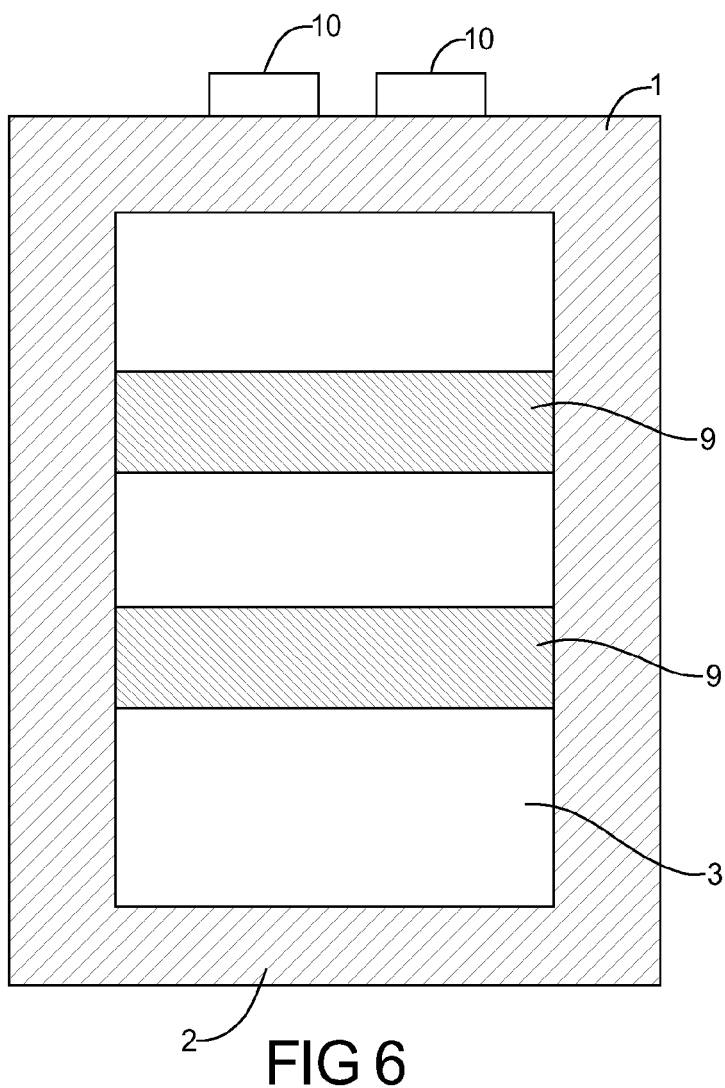
FIG. 6 shows a sealing frame, in the case of which the opening is divided by bars, which encompass a thickness, which is less than the thickness of the base body.
Figure 6A:
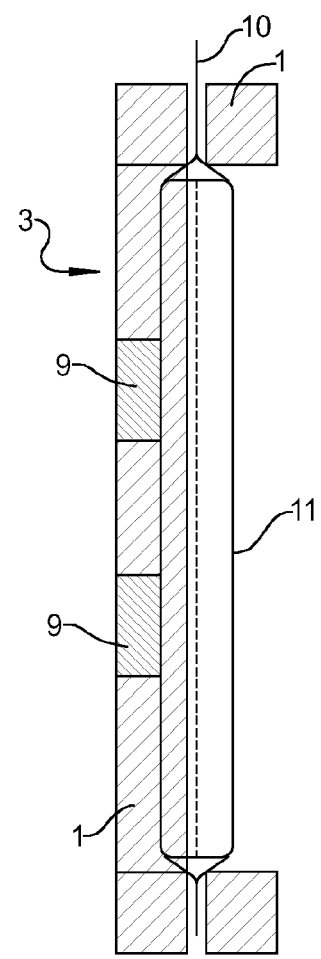
FIG. 6A is a schematic sectional view of the sealing frame of FIG. 6.

FIGS. 6 and 6A show a sealing frame 1 comprising a base body 2, in the case of which the opening 3 is divided by means of bars 9, which encompass a thickness, which is less than the thickness of the base body 2. The bars 9 prevent directly adjacent cells 11 from touching.

Figure 7:
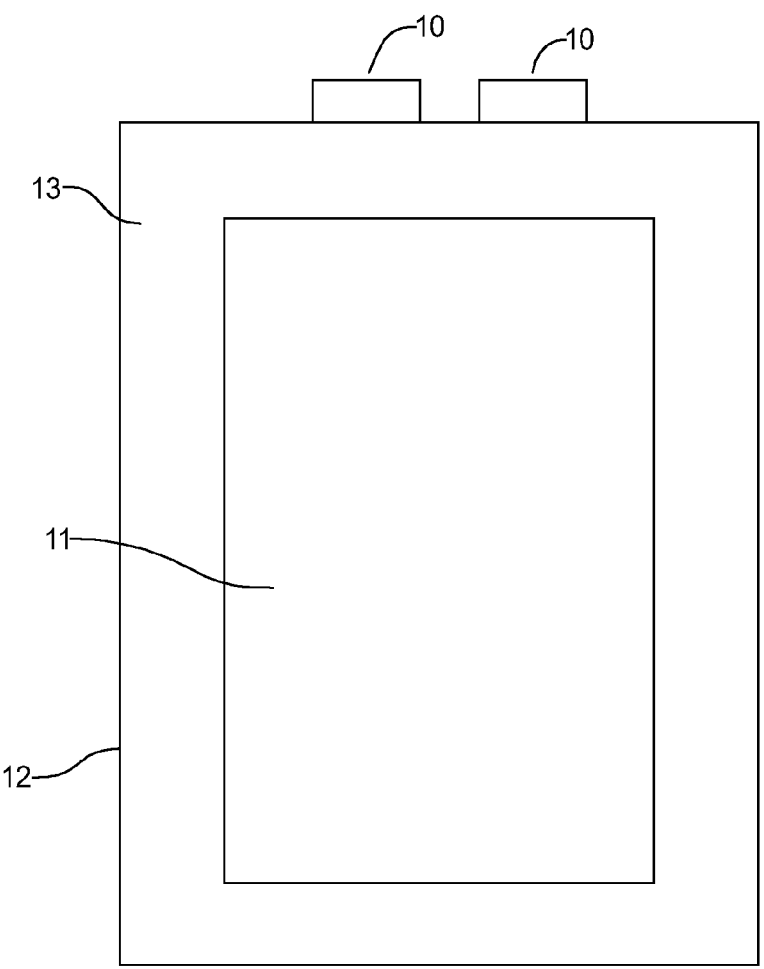
FIG. 7 shows on the left-hand side a top view onto a coffee bag cell, from which electrodes project.
Figure 7A:
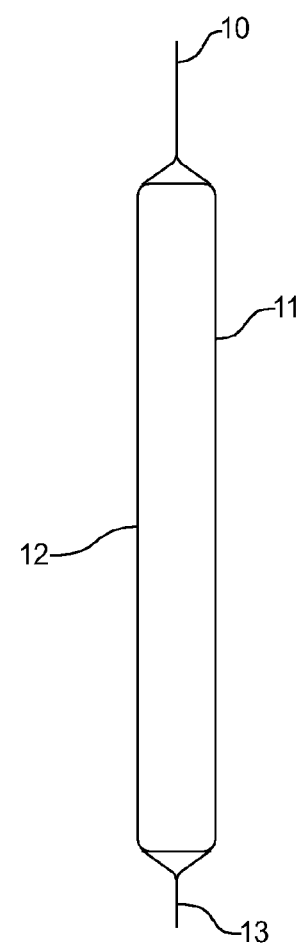
FIG. 7A is a side view of the coffee bag cell.

FIG. 7 shows a cell 11, which is embodied as a coffee bag cell. A top view of the cell 11 is shown in FIG. 7A. The interior of the cell 11, namely the electrode/separator stack, is located in the cell housing 12, which consists of a coated metal. Concretely, aluminum is provided with a polyolefin coating.

Typical widths and lengths of the cell housing 12 of cells 11, which are used in electric vehicles, are typically more than 20 cm. Such cell housings 12 have a thickness of approximately 1 cm. The cell housing 12 encompasses a revolving sealed seam 13 having a width of approximately 1 cm, on which two coated metals, namely the films, are laminated closely together. The typical thickness of the sealed seam 13 is approximately 1 to 2 mm. The deviation plates 10 of the electrodes project out of the sealed seam 13. The deviation plates 10 are made of metal and typically have a thickness of less than 1 mm. A side view of the cell 11 is shown on the right-hand side of FIG. 7.

Figure 8:
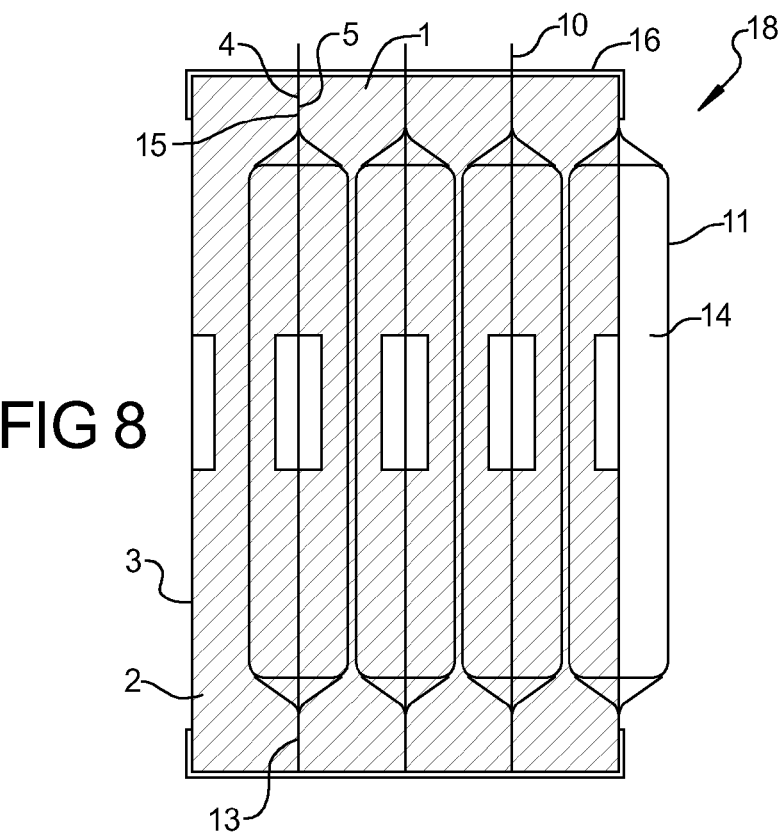
FIG. 8 shows a schematic view of a stack of individual coffee bag cells, between which sealing frames are arranged, wherein the sealing frames are pressed together in a positive manner by means of a fixing frame.

FIG. 8 shows a stack of a plurality of cells 11, which are spaced apart from one another in the area of the sealed seam 13. The sealed seams 13 are pressed by means of the sealing frames 1. One sealing frame 1 thereby encloses the cell 11 circumferentially. The deviation plates 10 of the electrodes project out of the sealing frames 1. The sealing frames 1 project beyond the sealed seams 13. A seal against moisture from the atmosphere is provided through this, because two adjacent sealing frames 1 abut directly on one another in the zone, which projects beyond the sealed seams 13. It is also possible for the sealing frames 1 to be gripped with one another in a positive manner. Preferably, buffer spaces, which are sufficiently covered by the sealing frames 1, are embodied between adjacent cells 11. It can be ensured through this that no additional pressure onto the sealed seams 13 is created in response to a maximal thickness of the cells 11.

Concretely, this figure also shows a battery 18, comprising at least two sealing frames 1 and at least one cell 11, wherein one cell 11 is positioned between two sealing frames 1, wherein the cell 11 encompasses a thickened area 14, which extends into the openings 3 of the base bodies of the sealing frames 1 and wherein the cell 11 encompasses a tapered area 15, on which the sealing surfaces 4, 5 abut so as to form a seal. The sealing surfaces 4, 5 accommodate the tapered area 15 area by area in a sandwich-like manner and furthermore abut on one another so as to form a seal. The tapered area 15 is embodied as a sealed seam 13. The thickened area 14 encloses the interior of the cell 11, namely the electrode/separator stack. Deviation plates 10 of the electrodes of the cells 11, which project beyond the sealing frames 1, are accommodated between the sealing frames 1. The sealing frames 1 are positioned by means of a fixing frame 16, which presses the sealing elements 1 together. It is to be ensured hereby that the surface pressure onto the sealing frames 1 is approximately constant.

FIG. 9 shows two abutting sealing frames 1, the recesses 6 of which join to form a reference discharge location. The sealed seam 13 has contact to the atmosphere hereby. Two curved recesses 6 join to form a complete hole. A reference discharge location, which does not abut on the sealed seam 13 so as to apply pressure and which thus provides a way out for an escaping electrolyte, is attained through this. The recesses 6 should be arranged as far away from the deviation plates 10 of the electrodes as possible. An exhaust hood 17, which has a positive fit with the sealing frame 1, is arranged above the recesses 6 of the sealing frames 1. The exhaust hood 17 allows for a reliable removal of electrolytic gases, which are emitted from the recesses 6.

FIGS. 10 and 10A show a sealing frame according to FIG. 1, wherein a cooling device 19, in this embodiment tubular cooling ducts, are integrated into the base body 2. In this embodiment, the sealing frame 1 is embodied so as to be thermally conductive. A sandwich design, as is described in FIGS. 4 and 5, is also possible here.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A sealing frame for use in a battery comprising a base body, wherein the base body defines an enclosed perimeter that encompasses an opening, wherein a majority of a perimeter of a first face of the base body encompasses a first sealing surface and a majority of a perimeter of a second face of the base body opposite the first face encompasses a second sealing surface, wherein a majority of the base body has a complete rectangular cross section including the first face and the second face on opposite sides thereof and a minority portion of at least one of the first and second faces defining a recess therein, said recess extending across the at least one of the first and second faces and extending completely from an innermost edge of the base body that defines the opening to an outermost perimeter edge of the at least one of the first and second faces, wherein the first sealing surface and the second sealing surface is embodied so as to be elastically compressible.

2. The sealing frame according to claim 1, wherein the first sealing surface and/or the second sealing surface is embodied as an elastically compressible layer, which is applied onto a non-elastic support body.

3. A sealing frame for use in a battery comprising a base body, wherein the base body defines an enclosed perimeter that encompasses an opening, wherein a majority of a perimeter of a first face of the base body encompasses a first sealing surface and a majority of a perimeter of a second face of the base body opposite the first face encompasses a second sealing surface located opposite to the first sealing surface, wherein a majority of the base body has a complete rectangular cross section including the first face and the second face on opposite sides thereof and a minority portion of at least one of the first and second faces defining a recess therein, said recess extending across the at least one of the first and second faces and extending completely from an innermost edge of the base body that defines the opening to an outermost perimeter edge of the at least one of the first and second faces, wherein the first sealing surface and the second sealing surface is embodied so as to be elastically compressible.

4. The sealing frame according to claim 1, wherein provision is made in the first sealing surface and/or in the second sealing surface for a local area of higher elasticity.

5. The sealing frame according to claim 1, wherein provision is made in the opening for bars, which encompass a thickness, which is less than the thickness of the base body.

6. The sealing frame according to claim 1, wherein the base body is provided with an adhesive.

7. The sealing frame according to claim 1, wherein a cooling unit is integrated into the sealing frame.

8. A battery comprising at least two sealing frames each comprising a base body, wherein the base body defines an enclosed perimeter that encompasses an opening extending all the way through the frames, wherein a majority of a perimeter of a first face of the base body encompasses a first sealing surface and a majority of a perimeter of a second face of the base body opposite the first face encompasses a second sealing surface located opposite thereto, wherein a majority of the base body has a complete rectangular cross section including the first face and the second face on opposite sides thereof and a minority portion of at least one of the first and second faces defining a recess therein, said recess extending across the at least one of the first and second faces and extending completely from an innermost edge of the base body that defines the opening to an outermost perimeter edge of the at least one of the first and second faces, wherein the first sealing surface and the second sealing surface is embodied so as to be elastically compressible, and at least one cell, wherein the cell is positioned between said at least two sealing frames, wherein the cell encompasses a thickened area, which extends into the openings of the base bodies thereof and wherein the cell encompasses a tapered area, on which the first and second sealing surfaces of said at least two sealing frames abut so as to form a seal, wherein an exhaust hood is arranged on the battery covering the recesses in said at least two sealing frames.

9. The battery according to claim 8, wherein the sealing surfaces accommodate the tapered area at least area by area in a sandwich-like manner and in that they abut on one another so as to form a seal.

10. The battery according to claim 8, wherein deviation plates of electrodes of the at least one cell, which project beyond the sealing frames, are accommodated between the sealing frames.

11. The battery according to claim 8, wherein at least one sensor, which detects pressures, is arranged between the sealing frames.

12. The battery according to claim 8, wherein the at least one cell is embodied as a coffee bag cell comprising a sealed seam.

* * * * *